US010859420B2

United States Patent
Slot, III et al.

(10) Patent No.: US 10,859,420 B2
(45) Date of Patent: Dec. 8, 2020

(54) AUTONOMOUS CHEMICAL INJECTION SYSTEM FOR OIL AND GAS WELLS

(71) Applicant: National Coupling Company, Inc., Stafford, TX (US)

(72) Inventors: Maurice Slot, III, Stafford, TX (US); Nathan Smith, Stafford, TX (US); Thomas Rogala, Stafford, TX (US); Chris Roy, Stafford, TX (US)

(73) Assignee: National Coupling Company, Stafford, TX (US)

( * ) Notice: Subject to any disclaimer, the term of this patent is extended or adjusted under 35 U.S.C. 154(b) by 0 days.

(21) Appl. No.: 15/884,984

(22) Filed: Jan. 31, 2018

(65) Prior Publication Data

US 2018/0216982 A1    Aug. 2, 2018

Related U.S. Application Data (60) Provisional application No. 62/453,351, filed on Feb. 1, 2017.

(51) Int. Cl.
*F16K 31/12* (2006.01)
*G01F 11/04* (2006.01)
(Continued)

(52) U.S. Cl.
CPC ............ *G01F 11/04* (2013.01); *E21B 33/068* (2013.01); *G01F 15/005* (2013.01); *G01F 15/07* (2013.01);
(Continued)

(58) Field of Classification Search
CPC ........ G01F 11/04; G01F 11/005; G01F 11/07; G01F 15/005; G01F 15/07; G01F 15/001;
(Continued)

(56) References Cited

U.S. PATENT DOCUMENTS 3,098,382 A * 7/1963 Hoffman ............... F15B 19/002
                                                           73/1.21
3,537,619 A * 11/1970 Glesner ................... G01F 11/04
                                                          222/334
(Continued)

FOREIGN PATENT DOCUMENTS

| GB | 2454297 A | 5/2009 |
|---|---|---|
| WO | 2000063075 A1 | 10/2000 |
| WO | 2013115934 A1 | 8/2013 |

OTHER PUBLICATIONS

Search report dated Jun. 6, 2018 in counterpart Great Britain application GB1801619.6.
(Continued)

*Primary Examiner* — Minh Q Le
(74) *Attorney, Agent, or Firm* — Blank Rome LLP (57) ABSTRACT

A positive displacement metering system measures the rate of travel of a free piston in a cylinder of known volume to determine the flow rate of a fluid out of the cylinder. The system may also measure and record the inlet and outlet pressures or the differential pressure between the fluid inlet and outlet. The control program positions a four-way valve which may function as an adjustable metering orifice in response to the measured flow rate and/or changes in the inlet and outlet pressures to achieve the desired flow rate. At the end of each stroke, the four-way valve is repositioned to reverse fluid flow through the metering cylinder. The system may revise the valve position settings for both forward and reverse strokes based on the measured time required for a full stroke of the piston within the cylinder at a certain valve position or a measured rate of movement of the free piston.

22 Claims, 8 Drawing Sheets

(51) Int. Cl.
*G05D 7/06* (2006.01)
*E21B 33/068* (2006.01)
*G01F 15/00* (2006.01)
*G01F 15/07* (2006.01)
*E21B 37/06* (2006.01)
*E21B 41/02* (2006.01)

(52) U.S. Cl.
CPC ............ *G05D 7/0635* (2013.01); *E21B 37/06* (2013.01); *E21B 41/02* (2013.01); *G01F 15/001* (2013.01)

(58) Field of Classification Search
CPC ........ E21B 33/068; E21B 37/06; E21B 41/02; G05D 7/0635
USPC ........... 137/486, 487.5, 8, 9; 166/305.1, 310
See application file for complete search history.

(56) References Cited

U.S. PATENT DOCUMENTS

| | | | | |
|---|---|---|---|---|
| 3,552,606 A * | 1/1971 | Kraft | ............... | G01F 11/04 222/249 |
| 3,565,287 A * | 2/1971 | Mack | ............... | G01F 11/04 222/249 |
| 3,834,586 A | 10/1974 | Wilhelmson | | |
| 4,325,127 A * | 4/1982 | Major | ............... | F04B 13/00 137/595 |
| 4,334,636 A * | 6/1982 | Paul | ............... | G01F 11/04 222/326 |
| 4,494,677 A * | 1/1985 | Falcoff | ............... | B01F 15/0454 222/63 |
| 4,627,267 A | 12/1986 | Cohrs et al. | | |
| 4,674,317 A * | 6/1987 | Cohrs | ............... | G01F 25/0015 73/1.21 |
| 4,996,869 A * | 3/1991 | Cohrs | ............... | G01F 25/0015 702/100 |
| 5,111,682 A * | 5/1992 | Halpin | ............... | G01F 25/0015 73/1.19 |
| 5,992,696 A * | 11/1999 | Schultz | ............... | F04B 9/109 222/146.2 |
| 6,745,838 B2 * | 6/2004 | Watson | ............... | E21B 34/04 166/310 |
| 6,973,936 B2 | 12/2005 | Watson | | |
| 7,934,413 B2 * | 5/2011 | Winchester | ............... | G01F 25/003 73/1.21 |
| 7,963,422 B2 * | 6/2011 | Ramnarine | ............... | F04B 9/125 222/1 |
| 8,555,914 B2 | 10/2013 | Smith, IV et al. | | |
| 9,255,465 B2 | 2/2016 | Smith, IV et al. | | |
| 9,523,262 B2 | 12/2016 | Smith, IV et al. | | |
| 2010/0126600 A1 * | 5/2010 | Watson | ............... | E21B 33/068 137/486 |
| 2012/0298696 A1 * | 11/2012 | Milo | ............... | B01F 15/0466 222/250 |

OTHER PUBLICATIONS

Examination Report dated Jan. 17, 2020 in counterpart Great Britain application GB1801619.6, 4-pgs.

* cited by examiner

AUTONOMOUS CHEMICAL INJECTION SYSTEM FOR OIL AND GAS WELLS

CROSS-REFERENCE TO RELATED APPLICATIONS

This application claims the benefit of U.S. Provisional Patent Application No. 62/453,351 filed on Feb. 1, 2017, the contents of which are hereby incorporated by reference in their entirety.

STATEMENT REGARDING FEDERALLY SPONSORED RESEARCH OR DEVELOPMENT

None

BACKGROUND OF THE INVENTION

1. Field of the Invention

This invention relates to chemical injection systems for oil and gas wells. More particularly, it relates to autonomous control systems for injecting liquid phase chemical treatment agents into undersea wells.

2. Description of the Related Art Including Information Disclosed Under 37 CFR 1.97 and 1.98

A variety of chemical agents are injected into hydrocarbon wells for the control of corrosion, hydrates, asphaltenes, paraffins, scale and the like. These chemical agents are typically in the liquid phase and are pumped into the well at a selected rate using a chemical injection system. For undersea wells, the chemical supply and pump may be located on a production platform and are commonly connected to the wellhead via an umbilical line. If metering of the chemical agent is performed only at the surface, any leak in the umbilical or its connectors will give an erroneous indication of the quantity of chemical agent being injected into the well. Moreover, each subsea well may require its own injection system on the platform and connecting umbilical line.

Certain metering systems of the prior art employ a variable orifice—an adjustable orifice that allows remote control of flow at each well. Other metering systems of the prior art rely on pressure-compensated flow control—an adjustable pressure regulator and a fixed orifice can maintain a constant flow at each well.

Metering flow over a large range is often necessary over the life of the well. Orifice metering is limited in range and subject to filming, clogging and differing fluid properties.

Particulate contamination in long chemical injection lines is unavoidable and can clog the small orifices needed for metering and control. Filters on the lines are an added complication affecting system reliability, increasing capital costs and requiring periodic service (which increases operating costs).

U.S. Pat. No. 6,973,936 to Richard R. Watson discloses a fluid injection system that controls the distribution of fluid from a supply line to a selected well at an adjustable rate. A free piston ("fluid barrier") divides a cylinder into first and second chambers. A multi-position valve comprises a first position for passing fluid from the supply line into the first chamber to displace fluid from the second chamber back through the valve to an injection point, and a second position for passing fluid from the supply line to the second chamber to displace fluid from the first chamber back through the valve to the injection point. A control system in communication with a position sensor times displacement of the free piston to selected positions, and selectively adjusts a variable valve opening to adjust flow rate, switch between the first and second positions, and periodically increase the valve opening for cleaning.

U.S. Pat. Nos. 8,555,914, 9,255,465 and 9,523,262, the contents of which are hereby incorporated by reference in their entireties, disclose methods for the autonomous control of a chemical injection system for oil and gas wells. Using the apparatus disclosed in U.S. Pat. No. 6,973,936 and the methods disclosed in U.S. Pat. Nos. 8,555,914, 9,255,465 and 9,523,262, no direct information is available concerning the position of the free piston except at the limits of its travel. This can be a problem for injection systems having low flow rates—e.g. one or two gallons per day. If the piston becomes stuck mid-travel or the fluid delivery system otherwise becomes blocked, that situation may not be detected for an extended period of time. Using the systems of the prior art, it would not be until the expected time for a full stroke of the piston had passed that the system would open the valve further in an effort to clear the blockage. The present invention solves this problem.

BRIEF SUMMARY OF THE INVENTION

The present invention may be embodied in an apparatus and a control program for a positive displacement fluid metering system that measures the time required for a free piston (or other fluid barrier) in a cylinder (or other metering body) of known dimensions to move to move a certain distance and thereby determine an average flow rate during that movement of the piston. The system may also measure and record the inlet and outlet pressures or the differential pressure between the fluid inlet and outlet. The controller may take flow rate commands from a client subsea control pod and set the rate of flow by partially opening a four-way valve each time the valve is reversed.

The control program precisely positions a four-way valve which may function as an adjustable metering orifice in response to the measured flow rate and/or changes in the inlet and outlet pressures to achieve the desired flow rate. At the completion of each stroke, the four-way valve is repositioned to reverse the flow of fluid through the metering cylinder.

The system may revise stored valve position settings for both forward and reverse strokes based on the measured time required for movement of the piston a known distance. In this way, the system iteratively compensates for any changes in fluid properties and fluid pressure. Certain embodiments of the invention additionally comprise an optional cleaning cycle which progressively opens the valve stepwise and may, if necessary, fully open the valve in both fluid flow directions in order to clear an obstruction of the valve orifice. It has been found that shear seal gate type valve construction is the design best suited for reliable operation when high pressure fluids are contaminated with hard particulate matter. The standard operating procedure for clearing a blocked valve of this type is to move it to the fully opened and fully closed positions. This allows the accumulated particulates to pass and the seal elements to sweep away or shear any remaining obstructions. By employing this valve construction for the two-position four-way control valve and by controlling the valve actuator in response to the cylinder stroke time, precise flow control with excellent contamination resistance results.

The actuation of the two-position four-way control valve may be accomplished with a conventional stepper motor which drives a ball screw to convert rotation to linear motion. This combination has been found to give very high precision to the linear position of the valve. This precision allows the valve to be partially opened thus creating a precision orifice each time the valve is shifted.

As the valve is shifted to admit flow to first one then the other side of the cylinder piston, flow rate is regulated by the precision orifice created by the partially opened valve. In certain embodiments, a dwell time after the cylinder piston has completed its travel and flow has stopped is included. This provides precise control of the volume of chemical injected into the oil or gas well production stream in a certain period of time.

A system according to the invention may be designed to accommodate all chemicals currently used for the control of corrosion, hydrates, asphaltenes, paraffins, and scale in hydrocarbon wells. Viscosity or density changes of the fluid do not require recalibration of the positive displacement metering system. Verification data can be sent to the client subsea control pod.

Using a plurality of systems according to the invention can provide treatment chemical flow assurance for multiple subsea wells from a single umbilical.

DETAILED DESCRIPTION OF THE INVENTION

Figure 1A:
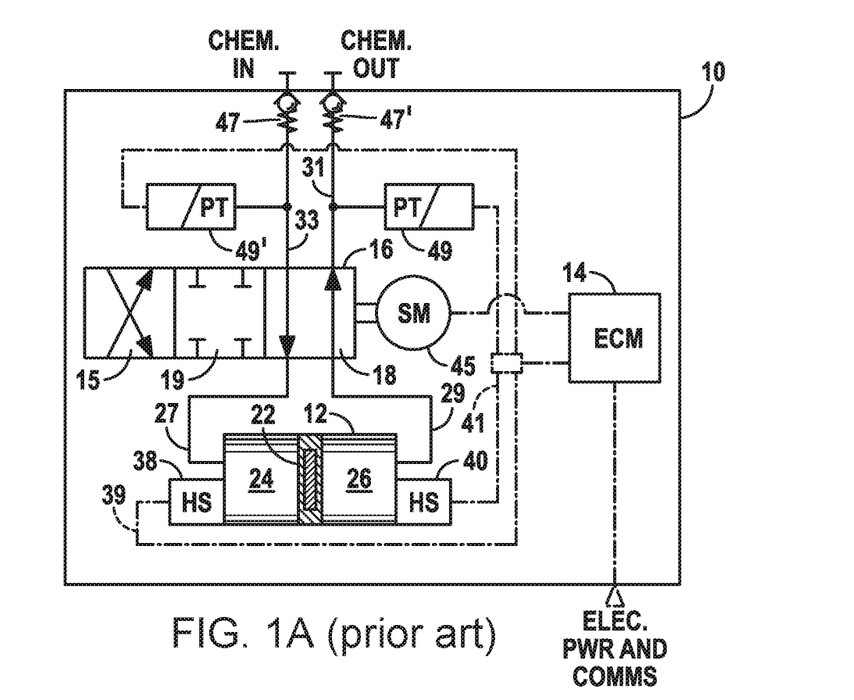
FIG. 1A is a schematic diagram of a chemical injection apparatus of the prior art.

FIG. 1A schematically illustrates a chemical injection system 10 of the prior art which comprises a metering body 12 interconnected with a control system (Electronic Control Module) 14 and a multi-position valve 16 driven by actuator 45. The metering body 12 has a bore for containing chemical fluid to be delivered to a well. An axially movable free piston 22 in the bore divides metering body 12 into variable-volume first and second chambers 24, 26. Free piston 22 seals with metering body 12 with a sealing member such as an O-ring. Metering body 12 and free piston 22 conventionally comprise a cylinder and piston assembly, as shown. First and second input-output ports are provided for passing fluid into and out of first and second chambers 24, 26. Supply line 33 supplies chemical fluids at high pressure through multi-position valve 16 to metering body 12.

In a first valve position shown in FIG. 1A, illustrated conceptually by alignment of parallel line segments 18 with lines 31 and 33, fluid passes from supply line 33, through multi-position valve 16, line 27, and into chamber 24. As fluid passes into chamber 24, fluid pressure urges free piston 22 toward one end of metering body 12, decreasing the volume of second chamber 26 and displacing the fluid out of metering body 12. Fluid exiting metering body 12 passes through line 29, back through valve 16, and out through line 31 and check valve 47' to an injection point in the well.

In a second position (not shown), which may be visualized conceptually by sliding the crossed flow lines 15 in valve 16 to the right to align with lines 31 and 33, fluid passes from supply line 33, through multi-position valve 16, line 29, and into chamber 26. As fluid passes into chamber 26, fluid pressure urges free piston 22 toward an end of metering body 12, decreasing the volume of chamber 24 and displacing the fluid out of metering body 12. Fluid exiting metering body 12 passes through line 27, back through valve 16, and out through line 31 to the same injection point in the well. Thus, by repeatedly reversing the direction of multi-function valve 16 after free piston 22 has reached a selected position, the fluid may be continually passed from line 33 to line 31 and thence to the injection point in the well.

Position sensors 38 and 40 are included for sensing certain discrete, preselected positions of free piston 22. Position sensors 38, 40 are in communication with control system 14 as represented by dashed lines 39, 41 through conventional means, such as by wire, optical fiber or wireless signal. When free piston 22 reaches the preselected positions, position sensors 38, 40 signal control system 14, in response to which control system 14 may selectively reverse the position of multi-position valve 16 to reverse the direction of travel of free piston 22.

Because the selected positions are known, relative displacement of free piston 22 is also known, corresponding to a known volumetric displacement of fluid from metering body 12, computed as the product of displacement of free piston 22 and cross-sectional area of bore 20. The control system 14 includes an internal timer for timing displacement of free piston 22 between the selected positions, as signaled by position sensors 38, 40. A volumetric flow rate is therefore also known, which may be computed as the volumetric displacement divided by displacement time. The multi-position valve 16 includes a variable valve opening for controlling flow between supply line 33 and metering body 12. The control system 14 selectively adjusts the variable valve opening in response to timed movement of free piston 22. If the piston movement time is too long, indicating a flow rate less than a desired flow rate, control system 14 may increase the variable valve opening to increase the flow rate. Conversely, if the piston movement time is too short, indicating a flow rate greater than the desired flow rate, control system 14 may selectively decrease the valve opening to reduce the flow rate. The flow rate of the fluid delivery to the well is thereby controlled.

As shown in FIG. 1A, the selected positions of free piston 22 are preferably the positions of free piston 22 having reached either end of metering body 12. The selected positions of free piston 22 could alternatively be anywhere along the range of travel of free piston 22, and need not be at the ends of metering body 12. In typical embodiments, as illustrated, position sensors 38, 40 are at substantially the same axial position as the selected positions. Conventional position sensors such as spring-loaded pins or magnetic or infrared proximity sensors may be used. In other embodiments, the position sensors conceivably may not need to be axially aligned with the selected positions. A position sensor may further comprise optional pressure transducers 49 and 49'. These types of position sensors may sense position implicitly, such as when there is a sudden drop of pressure in line 31 as the free piston reaches an end of metering body 12. Optional port valves on free piston 22 may be included for sealing the outlets of metering body 12 when free piston 22 reaches and end of metering body 12. This may more dramatically decrease pressure in line 31, and thereby provide a more distinct indication that free piston 22 has reached the end of its travel. Such an indication may provide a backup to confirm or substitute for position sensors 38 and 40.

The terms "first position" and "second position" in connection with valve 16 refer generally to the resulting direction of flow, rather than a fixed position of components of valve 16, because there is generally a degree of adjustability in each of the two positions, such as to adjust flow rate.

Hall Effect devices used in motion sensing and motion limit switches can offer enhanced reliability in extreme environments. As there are no moving parts involved within the sensor or magnet, typical life expectancy is improved compared to traditional electromechanical switches. Additionally, the sensor and magnet may be encapsulated in an appropriate protective material. Hall Effect devices when appropriately packaged are immune to dust, dirt, mud, and water. These characteristics make Hall Effect devices particularly preferred in a system according to the present invention for piston position sensing compared to alternative means such as optical and electromechanical sensing.

Controlling flow to a few gallons per day at pressure drop of several hundred pounds per square inch requires a very small orifice of just a few thousandths of an inch. The valve used in one particular preferred embodiment of the invention is a gate type shearing seal valve with a 2880:1 turndown ratio. This valve provides the required small orifice and reverses flow for each positive displacement charge so that clogging is avoided.

Certain systems of the prior art have used filters to avoid particulate clogging of small flow-control orifices but these filters typically need to be serviced subsea which is highly costly. Devices of the prior art have also used capillary orifices which are larger in area for a given restriction to flow and these can be made to adjust their bore diameter by means of a tapered mating screw thread so flow rates can be changed and a temporary larger opening can be used to provide cleaning of contamination. With each of these solutions, metering over a wide range of flow rates is a separate necessary task that requires expensive flow instrumentation; flow cannot be accurately measured by the pressure loss across an orifice of unknown restriction as is the situation with partial particulate clogging. The present invention may include means for creating the small metering orifice with a 4-way gate type valve that is constantly shifted to avoid clogging and may also be opened fully to allow particulate to pass. In addition, the system provides very accurate metering of the flow that is immune to partial clogging or change in fluid properties or filming of the orifice—all conditions which are present and can defeat conventional meters that rely on a pressure drop across an orifice.

Figure 1B:
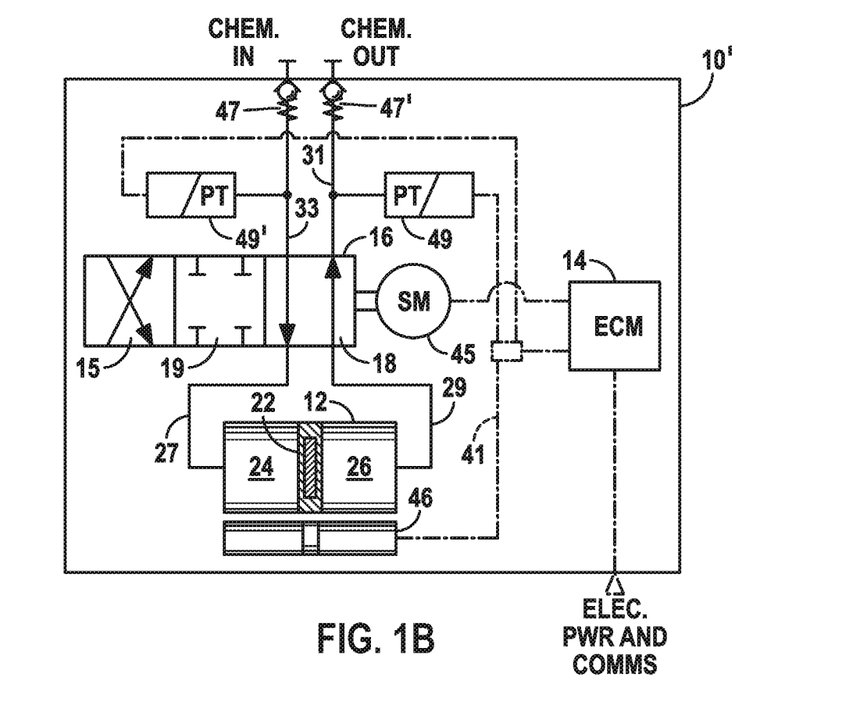
FIG. 1B is a schematic drawing of a chemical injection system equipped with a linear sensor for sensing any position of the free piston within the metering cylinder.

The pressure transducers 49 and 49' can provide the controller more information with which to establish the degree of valve opening, but they cannot measure or verify the flow rate. Measurement and verification of the flow rate is provided by the timing circuits and linear position sensor 46 on the positive displacement cylinder. In certain embodiments, one or more additional sensors may be provided for sensing full travel of the piston within the cylinder.

If the piston in the displacement cylinder fails to stroke in the expected time, a condition that indicates clogging, the controller can drive the 4-way valve to the full open position to allow debris to pass.

An orifice cannot be used as a reliable, subsea, flow-measuring device because it is subject to clogging and filming (coating) by the chemicals which pass through it. The chemicals which are metered in a chemical injection system for a hydrocarbon well may have filming characteristics as a desired trait. Common flow-measuring devices of the prior art use a measurement of pressure loss across an orifice to indicate flow. If an inexpensive pressure drop metering system cannot be used, the conventional alternatives are expensive. Additionally, no other metering device such as turbine, ultrasonic, vortex, or mass thermal type can match the range of a displacement cylinder according to the present invention; they all are limited to 100:1 to 200:1 total range. That means they can accurately measure 1 gallon per day (GPD) up to about 200 GPD. A system according to the present invention can measure 1 GPD up to over 3000 GPD. Also, many well treatment chemicals are non-Newtonian fluids—i.e., their viscosity changes with pressure in a nonlinear fashion, a characteristic that makes accurate flow measurement more challenging for most measurement technology of the prior art but has no effect on a system that employs a positive displacement cylinder.

The chemical injection system may comprise a processor and the method may be implemented as instructions for the processor which may be stored in a storage medium. The process may begin with an operator inputting the desired flow rate of the chemical to be injected. The flow rate may have the dimensions of unit volume per unit time. The flow rates for chemical injection systems used in connection with oil and gas wells in the domestic energy industry are often expressed in gallons per day (GPD). In certain embodiments, inputting the desired flow rate may be accomplished by an operator situated on an offshore production platform and the command may be transmitted to the controller on or near the subsea wellhead via an umbilical cable. The command may also be transmitted via a telemetry system from an onshore facility or another offshore unit.

In one particular preferred embodiment, system initialization includes driving the valve actuator to a mechanical limit by commanding a stepper motor driving the actuator to step a number of steps in one direction that exceeds the number of steps previously determined to correspond to full travel of the actuator. One or more reversals of the actuator followed by attempted "forward" travel in excess of the reverse travel may be used to ensure that the actuator is hard against the mechanical limit. Thus, although the initial position of the valve may be unknown upon system startup, an initialization routine can be used to move the valve to a known position. The system may determine initial valve settings (number of steps) for both forward and reverse valve positions from the desired flow rate input, a stored flow curve (e.g. FIG. 2) and valve cracking position data—i.e., the number of steps from the valve closed position to the point at which the valve orifice begins to open in a certain direction. In one particular preferred embodiment, initialization includes moving the valve actuator from the mechanical limit position to a "center" closed position (shown as 19 in FIGS. 1A and 1B) defined to be the midpoint between the "forward" valve cracking position and the "reverse" valve cracking position. By way of example, using the flow curve of FIG. 2, if the desired flow rate is 40 GPD and the forward valve cracking position is 33 steps from the "center" closed position, then the initial forward valve setting would be 171 steps from center (138+33). It has been found that the valve cracking position is valve-dependent and may vary from valve to valve and/or change following maintenance on the valve or valve actuator. The initial forward and reverse valve settings may be loaded in registers designated for that function.

Figure 2:
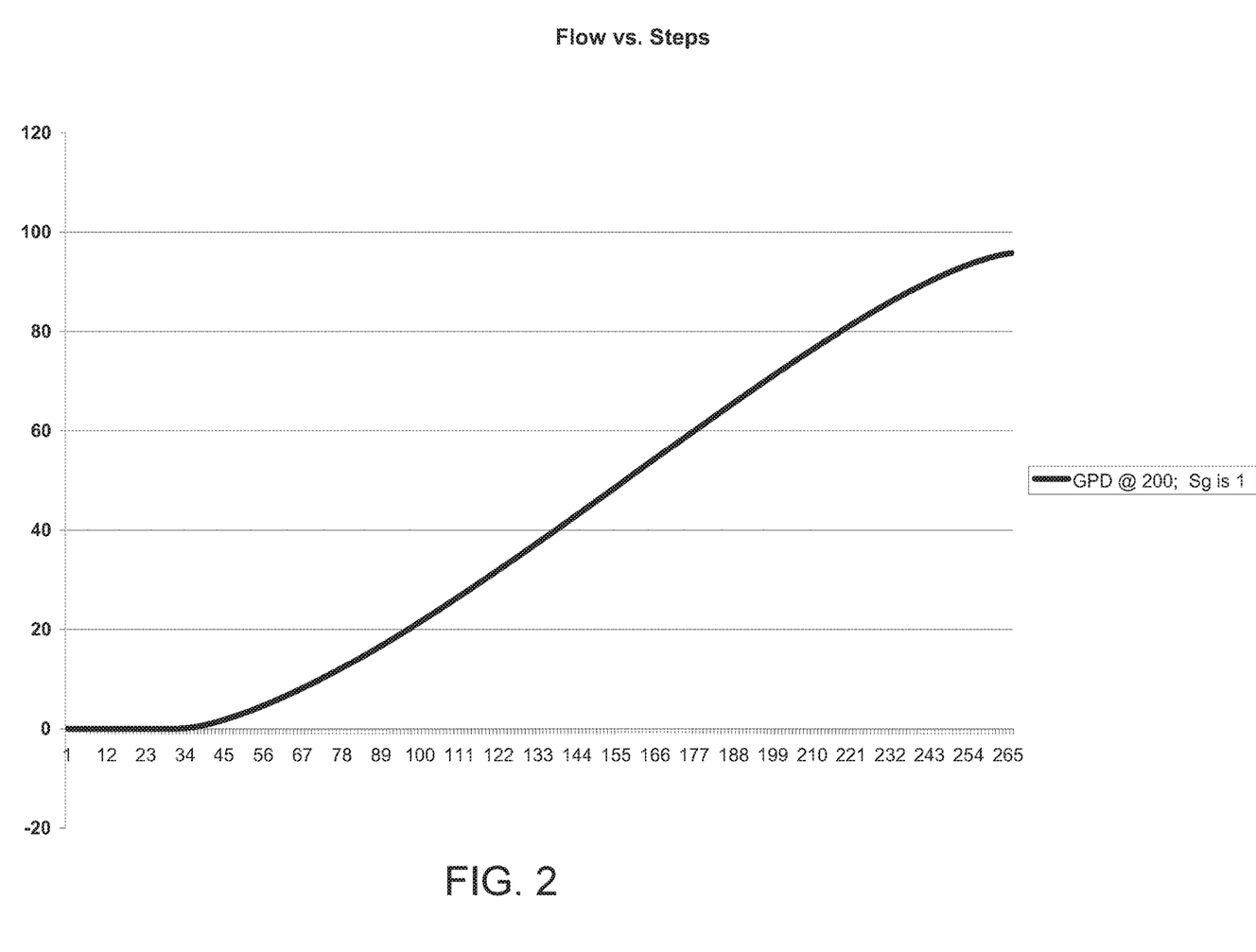
FIG. 2 is a graph of the flow produced by one particular representative control valve as a function of the number of steps made by a stepper motor driving the valve's actuator.

Flow curve data may be in the form of a digitized flow curve such as the curve depicted in FIG. 2. In one particular preferred embodiment, flow data is tabulated for each step of a stepper motor-actuated valve. In other embodiments, the flow curve data may be in the form of a mathematical representation—e.g., slope and intercept values for a substantially linear flow curve. In the case of embodiments using digitized curves, the system may comprise means for interpolating between data points using conventional curve fitting techniques.

In certain embodiments (not shown), the initial system inputs may include the selection of a particular flow curve which may be associated with a particular chemical or chemical mixture to be injected or with a certain property of the fluid to be injected—for example, the specific gravity of the fluid, the viscosity of the fluid, the concentration of an active ingredient(s) in a solvent, or the like. In yet other embodiments, the initial input may include a correction factor which the system may use to modify a previously stored, general-purpose flow curve for use with a specific chemical or chemical property—i.e., the stored flow curve may be for dilute aqueous solutions and a supplied correction factor allows the system to adapt the curve for a fluid having substantially different rheological properties. It will be appreciated, however, that a system according to the present invention will automatically compensate for fluids having different properties and tailoring the flow curve to a specific fluid provides an advantage only in the initial settings of the valve position and the first few computations of valve setting corrections.

While fluid is flowing, the outputs of pressure transducers 49 and 49' may be periodically sampled and a differential pressure (ΔP) stored by controller 14. In one particular preferred embodiment, a running average ΔP is stored by controller 14 along with the three most recent ΔP values in a FIFO stack. Additional filtering algorithms may be applied to eliminate or reduce the influence of pressure spikes which may be encountered during a stroke.

A valve setting correction may further be refined by a factor relating to a change in the average ΔP from the previous piston stroke. In certain embodiments, the ΔP correction factor may be a function (in whole or in part) of selected ΔP values, e.g., the three most recent ΔP values stored in the FIFO stack of the illustrated embodiment. Especially at relatively slow flow rates, a change in ΔP immediately prior to the end of the stroke may be more indicative of the ΔP likely to be encountered during the next forward stroke.

The ΔP correction may be derived from empirically determined values of flow rate at various differential pressures. In other embodiments, the ΔP correction may be calculated from a function which relates flow (or steps of the valve actuator motor 45) to ΔP.

It should be appreciated that the process of the present invention will function without ΔP data—i.e., the absence or failure of pressure sensor 49 and/or 49' will not disable the system. The corrections computed from piston movement times will compensate for changes in ΔP. The use of ΔP information may enable the system to make better predictions of the valve setting needed to produce the desired flow rate. However, the iterative process will "zero in" on the correct setting even without this data.

An exemplary embodiment of the invention is illustrated in FIG. 1B. FIG. 1A illustrates a chemical injection system (CIS) of the prior art for comparison. It is similar to the systems described in U.S. Pat. Nos. 6,973,936, 8,555,914, 9,255,465 and 9,523,262 but additionally comprises check valves 47 and 47' in lines 33 and 31, respectively and well as closed position 19 for multi-position valve 16. CIS 10 in FIG. 1A is equipped with Hall Effect sensors 38 and 40 for sensing when piston 22 is at an end of its stroke and hence multi-position valve 16 should be switched from parallel flow paths 18 to crossed flow paths 15 (or vice versa). However, in CIS 10, if the flow of the chemical treatment fluid slows or becomes completely blocked or otherwise ceases (and piston 22 remains in an intermediate position between sensors 38 and 40), the stoppage may not be detected until a pre-set timer expires without piston 22 reaching an end of its stroke (and activating either sensor 38 or sensor 40). This is a particular problem in chemical injection systems wherein the desired flow rate is low relative to the volume of cylinder 12—e.g. a one-gallon-per-day injection rate in a CIS having a ½-gallon metering cylinder. The failure of such a system might not be detected for 12 hours—the nominal period for a single stroke of piston 22.

CIS 10' illustrated in FIG. 1B is an improvement upon prior art CIS 10 (shown in FIG. 1A). CIS 10' comprises linear piston-position sensor 46 in place of sensors 38 and 40 of CIS 10. Linear sensor 46 may be selectively responsive to all positions of free piston 22. In this way, lack of movement on the part of piston 22 may be quickly detected. In yet other embodiments, CIS 10' may additionally comprise sensors 38 and 40 (as illustrated in FIG. 1A) for detecting full travel of piston 22 and/or functioning as a backup for linear sensor 46. In the illustrated embodiment, linear sensor 46 comprises an array of Hall Effect sensors.

A Hall Effect sensor is a type of sensor whose output signal is a function of the magnetic field density around it. Linear or analog Hall Effect sensors provide a continuous voltage output that increases with a strong magnetic field and decreases with a weak magnetic field. In linear output Hall Effect sensors, as the strength of the magnetic field increases, the output signal from the amplifier will also increase until it begins to saturate by the limits imposed on it by the power supply. Any additional increase in the magnetic field will have no effect on the output but drive it more into saturation.

Digital output Hall Effect sensors have a Schmitt-trigger with built in hysteresis connected to an op-amp. When the magnetic flux passing through the Hall sensor exceeds a pre-set value, the output from the device switches quickly between "OFF" and "ON" states without any contact bounce. The built-in hysteresis eliminates oscillation of the output signal as the sensor moves in and out of the magnetic field—digital output sensors have just two states, "ON" and "OFF."

Other types of linear position sensors are available. The most common technologies used are Hall Effect, inductive, magneto-resistive and resistive. Linear position can be measured using devices such as linear variable differential transformers (LVDT) and linear potentiometers.

Magneto resistive sensors are devices that detect linear, angular or rotational displacement in a saturated magnetic field. They may comprise one or more saturated-mode, four-element Wheatstone bridge sense elements that output a voltage related to the direction of magnetic flux that is passing over the sensor. Multiple bridge elements may provide extended range for angular measurement. They are highly accurate, able to resolve position better than fractions of millimeters, handle large variations in the distance between magnet and sensor and are insensitive to vibration and shock.

In yet other embodiments, metering body 12 is transparent or has a transparent window extending longitudinally for the full stroke of piston 22. In such embodiments, linear sensor 46 may be an optical sensor.

The inclusion of sensors 38 and 40 in system 10' provides redundancy in the event of failure of linear piston sensor 46. For example, if no output (or no changing output) is received from linear piston sensor 46, switching of the multi-position valve 16 from a first position for passing fluid from the supply line into the first chamber to a second position for passing fluid from the supply line to the second chamber (i.e. from valve position 15 to valve position 18) may be accomplished upon actuation of sensor 38 or 40 responsive to the fluid barrier being at an end of the metering body. Further autonomous operation of system 10' may continue even with a failed linear sensor 46 by timing the interval from the actuation of sensor 38 responsive to the fluid barrier being at a first end of the metering body to the actuation of sensor 40 responsive to the fluid barrier being at a second end of the metering body, calculating an actual fluid flow rate from the timed interval (and the known volume of the metering body), and adjusting the size of the variable valve opening to minimize any difference between the calculated actual fluid flow rate and the desired fluid flow rate.

Exemplary methods of using the apparatus illustrated in FIG. 1B include: a method wherein a discrete "step" in the output of linear piston position sensor 46 must occur within a preset time limit in order for fluid delivery to be continued at the current valve setting; a method wherein any change in the output of linear piston position sensor 46 (digital or analog) is taken as an indication of piston movement; and, a method wherein the rate of change in the output of linear piston position sensor 46 is used to compute the current actual fluid flow rate and the valve setting is adjusted to compensate for any difference between the current actual fluid flow rate and the desired fluid flow rate input by the operator.

Figure 3A:
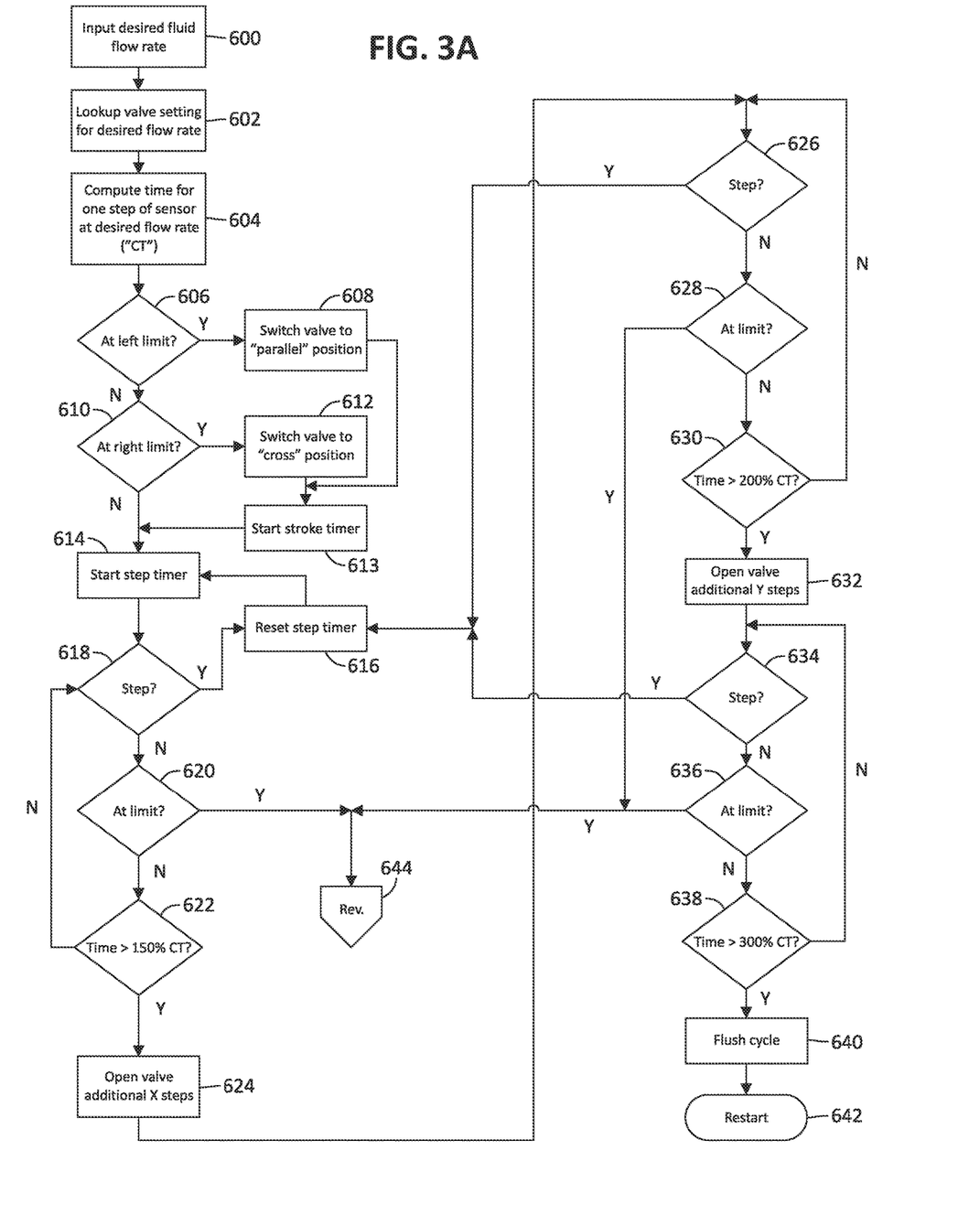
FIG. 3A and FIG. 3B are separate portions of a flowchart of a first method for controlling the apparatus depicted in FIG. 1B.
Figure 3B:
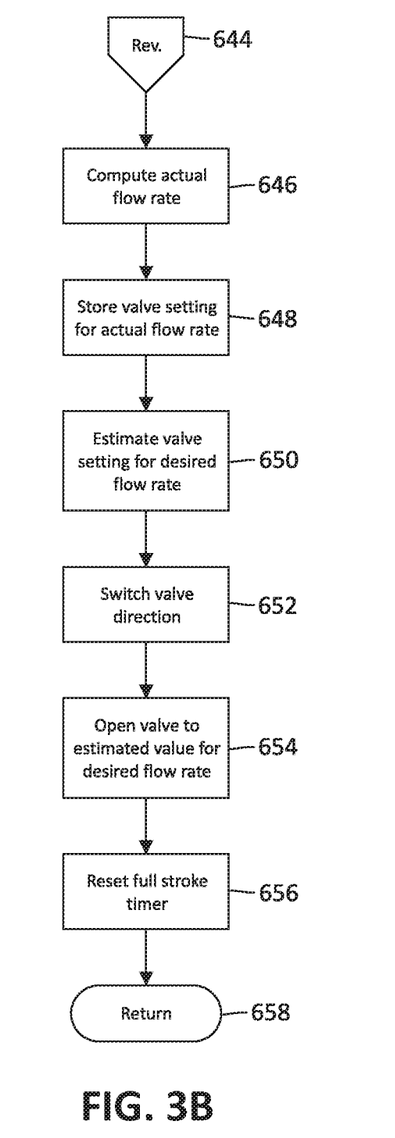

One particular method wherein a discrete "step" in the output of linear piston position sensor 46 must occur within a preset time limit in order for fluid delivery to be continued at the current valve setting is illustrated in flowchart form in FIGS. 3A and 3B. This method may be used with the apparatus illustrated in FIG. 1B wherein linear sensor 46 comprises an array of Hall Effect sensors that are equipped with Schmidt triggers such that the triggering of an adjacent sensor by movement of piston 22 may be detected as a "step"—i.e. one sensor in the array switching from an ON state to an OFF state and an adjacent sensor in the array switching from an OFF state to an ON state.

The method may begin at block 600 with the operator inputting a desired fluid flow rate. This information may be communicated to electronic control module (ECM) 14 via an umbilical cable (dash-dot line in FIG. 1B). At block 602, ECM 14 may then perform a table lookup (with interpolation, if necessary) to determine the valve setting expected to produce the desired flow rate. Using stepper motor 45, ECM 14 may then position metering valve 16 to the computed setting.

From the distance piston 22 must move to produce a detectable change ("step") in the output of linear sensor 46 and the dimensions of metering body 12, the time (CT) required to produce one step of sensor 46 at the desired flow rate may be computed (at block 604).

At decision diamond 606, the system may sense whether piston 22 is at its left limit of travel. If so (Y branch at 606), the valve is switched (at 608) to parallel flow position 18 and a timer configured for measuring the time required for a full stroke of piston 22 may be started (at 613). At decision diamond 610, the system may sense whether piston 22 is at its right limit of travel. If so (Y branch at 610), the valve is switched (at 612) to cross flow position 15 and a timer configured for measuring the time required for a full stroke of piston 22 may be started (at 613).

At block 614, a timer configured for measuring the time require for piston 22 to produce a "step" in the output of linear sensor 46 may be started. At decision diamond 618, the system may detect a step and reset the step timer (at 616). If and when no step is detected (N branch at 618), the system may detect whether piston 22 is at a limit of its travel (at 620). If so, (Y branch at 620) the system may proceed to execute the valve reversal routine (at 644) described hereinbelow. If piston 22 is not at a travel limit (N branch at 620), the system may query the step timer (at 622) to determine whether the step timer value has exceed 150% (or other selected percentage) of computed step time (CT). If not (N branch at 622), the system may continue to wait for a step to be detected. If the time limit is exceeded (Y branch at 624), the system may open valve 16 (at 624) a preselected number of steps (X) in an effort to increase the flow rate.

At decision diamond 626, the system again waits for a step to occur. If a step is detected (Y branch at 626), the step timer is reset (at 616) and the process continues (at 614). If no step is detected (N branch at 626), the system may determine (at 628) whether piston 22 is at a limit of its travel and, if so (Y branch at 628) may proceed to the valve reversal routine (at 644).

If piston 22 is not at a travel limit (N branch at 628), the system may query the step timer (at 630) to determine whether the step timer value has exceed 200% (or other selected percentage) of the computed step time (CT). If not (N branch at 630), the system may continue to wait for a step to be detected. If the time limit is exceeded (Y branch at 630), the system may open valve 16 an additional preselected number (Y) of steps (at 632) in a further effort to increase the flow rate.

At decision diamond 634, the system again waits for a step to occur. If a step is detected (Y branch at 634), the step timer is reset (at 616) and the process continues (at 614). If no step is detected (N branch at 634), the system may determine (at 636) whether piston 22 is at a limit of its travel and, if so (Y branch at 636) may proceed to the valve reversal routine (at 644).

If piston 22 is not at a travel limit (N branch at 636), the system may query the step timer (at 638) to determine whether the step timer value has exceed 300% (or other selected percentage) of the computed step time (CT). If not (N branch at 638), the system may continue to wait for a step to be detected. If the time limit is exceeded (Y branch at 630), the system may proceed (at 640) to a flush cycle (as described above) in an effort to clear a possible blockage in the valve. The system may then be restarted (at 642).

Valve reversal routine 644 is illustrated as a flowchart in FIG. 3B. At block 646, the actual fluid flow rate may be computed from the known volume of metering body 12 (less the volume of piston 22) and the length of time taken for piston 22 to move from one limit to the other (as measured by the full stroke timer). The valve position (e.g. number of steps of stepper motor 45 from a reference position) that produced the measured flow rate may then be stored in a table (at 648). In this way, the table of flow rate versus valve position may be updated with each cycle of piston 22. If valve 16 were opened additional steps during the cycle (e.g. at 632 and/or 624), the stored valve position setting may be a time-weighted average of the valve positions used during the stroke of piston 22 or otherwise adjusted. In an embodiment, the valve position table may not be updated in the event that more than one valve position was used during a stroke.

If the measured flow rate differs from the desired flow rate, the system may estimate (at 650) the valve setting required to produce the desired flow rate. In this way, the system adjusts itself iteratively to achieve the desired flow rate.

At block 652, the direction of travel of piston 22 is reversed by switching valve 16 from crossed-flow position 15 to parallel flow position 18, or vice versa. Valve 16 may then be positioned (at 654) to provide the desired flow rate. At 656, the timer configured for timing the full stroke period is reset for measuring the next stroke and, at 658, the system may return (e.g. to 613) for the next stroke of piston 22.

Figure 4A:
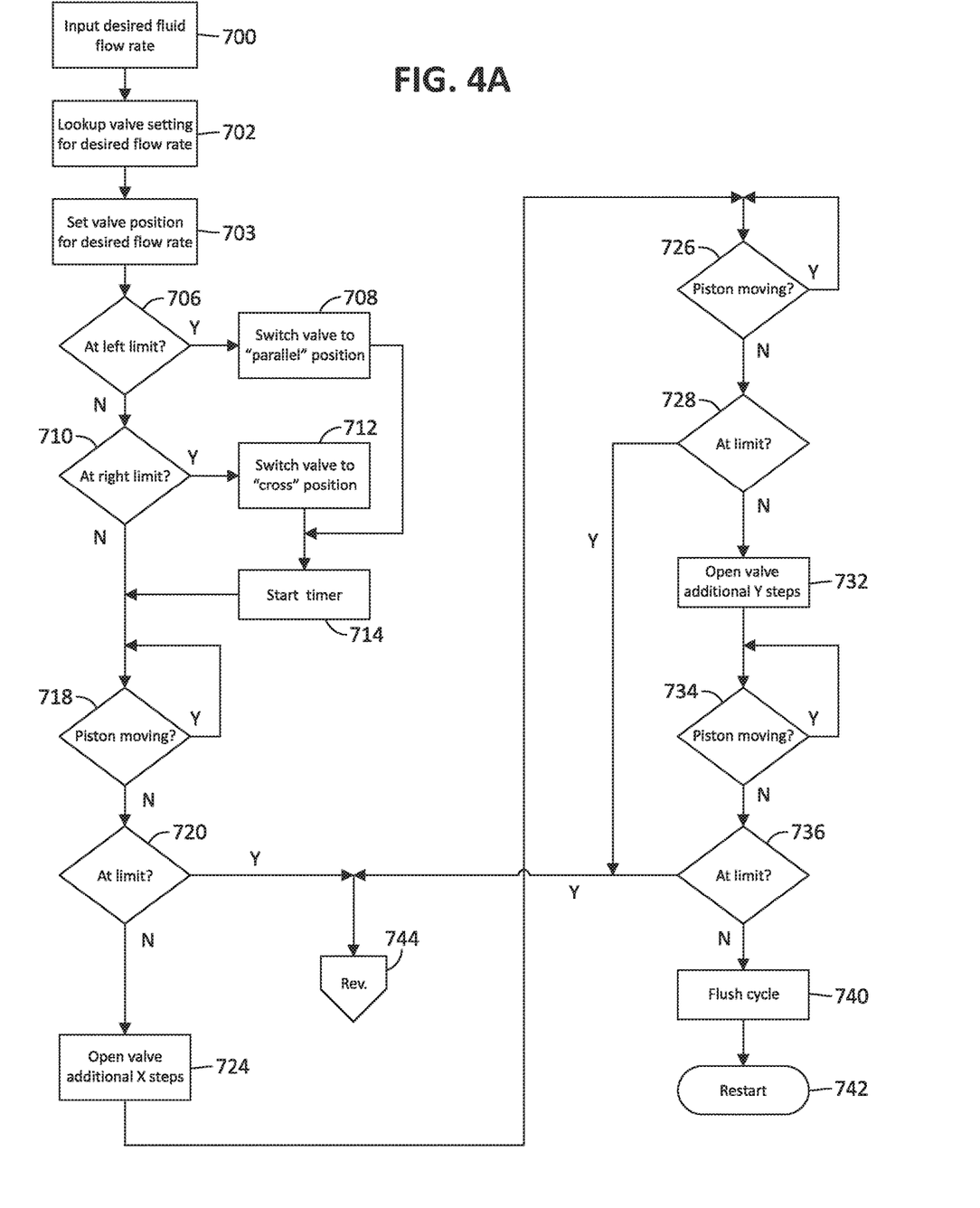
FIG. 4A and FIG. 4B are separate portions of a flowchart of a second method for controlling the apparatus depicted in FIG. 1B.
Figure 4B:
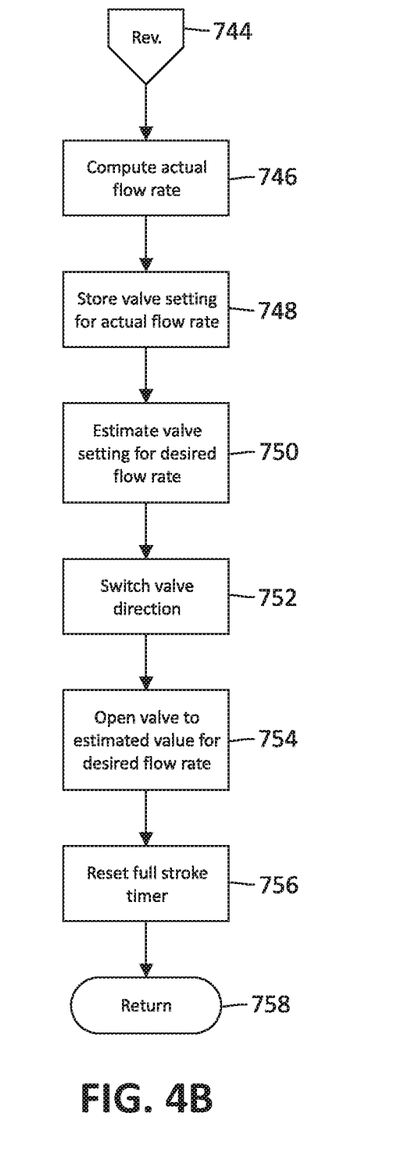

One particular method wherein the output of linear piston position sensor 46 is simply used to confirm movement of piston 22 throughout its travel from one limit to the other is illustrated in flowchart form in FIGS. 4A and 4B. This method may be used with an apparatus illustrated in FIG. 1B wherein linear sensor 46 has either an analog or a digital output.

The method may begin at block 700 with the operator inputting a desired fluid flow rate. This information may be communicated to electronic control module (ECM) 14 via an umbilical cable (dash-dot line in FIG. 1B). At block 702, ECM 14 may then perform a table lookup (with interpolation, if necessary) to determine the valve setting expected to produce the desired flow rate. Using stepper motor 45, ECM 14 may then position metering valve 16 to the computed setting.

At decision diamond 706, the system may sense whether piston 22 is at its left limit of travel. If so (Y branch at 706), the valve is switched (at 708) to parallel flow position 18 and a timer configured for measuring the time required for a full stroke of piston 22 may be started (at 713). At decision diamond 710, the system may sense whether piston 22 is at its right limit of travel. If so (Y branch at 710), the valve is switched (at 712) to crossflow position 15 and a timer configured for measuring the time required for a full stroke of piston 22 may be started (at 714).

At decision diamond 718, the system may detect whether piston 22 is moving by sensing a change in the output of linear position sensor 46. It will be appreciated by those skilled in the art that this may involve a time delay (that depends on the resolution of linear position sensor 46) that should be sufficient to detect motion of piston 22 at the desired flow rate. If and when no motion is detected (N branch at 718), the system may detect whether piston 22 is at a limit of its travel (at 720). If so, (Y branch at 720) the system may proceed to execute the valve reversal routine (at 744) described hereinbelow. If piston 22 is not at a travel limit (N branch at 720), the system may open valve 16 (at 724) a preselected number of steps (X) in an effort to obtain fluid flow (as evidenced by movement of piston 22).

At decision diamond 726, the system again detects whether piston 22 is moving. If not (N branch at 726), the system may determine (at 728) whether piston 22 is at a limit of its travel and, if so (Y branch at 728) may proceed to the valve reversal routine (at 744).

If piston 22 is not at a travel limit (N branch at 728), the system may open valve 16 an additional preselected number (Y) of steps (at 732) in a further effort to obtain fluid flow.

At decision diamond 734, the system may determine whether piston 22 is at a limit of its travel and, if so (Y branch at 736) may proceed to the valve reversal routine (at 744).

If piston 22 is not at a travel limit (N branch at 736), the system may (at 740) perform a flush cycle (as described above) in an effort to clear a possible blockage in the valve. The system may then be restarted (at 742).

Valve reversal routine 744 is illustrated as a flowchart in FIG. 4B. At block 746, the actual fluid flow rate may be computed from the known volume of metering body 12 (less the volume of piston 22) and the length of time taken for piston 22 to move from one limit to the other (as measured by the full stroke timer). The valve position (e.g. number of steps of stepper motor 45 from a reference position) that produced the measured flow rate may then be stored in a table (at 748). In this way, the table of flow rate versus valve position may be updated with each cycle of piston 22. If valve 16 were opened additional steps during the cycle (e.g. at 732 and/or 724), the stored valve position setting may be a time-weighted average of the valve positions used during the stroke of piston 22 or otherwise adjusted. In an embodiment, the valve position table may not be updated in the event that more than one valve position was used during a stroke.

If the measured flow rate differs from the desired flow rate, the system may estimate (at 750) the valve setting required to produce the desired flow rate. In this way, the system adjusts itself iteratively to achieve the desired flow rate.

At block 752, the direction of travel of piston 22 is reversed by switching valve 16 from crossed-flow position 15 to parallel flow position 18, or vice versa. Valve 16 may then be positioned (at 754) to provide the desired flow rate. At 756, the timer configured for timing the full stroke period is reset for measuring the next stroke and, at 758, the system may return (e.g. to 713) for the next stroke of piston 22.

Figure 5A:
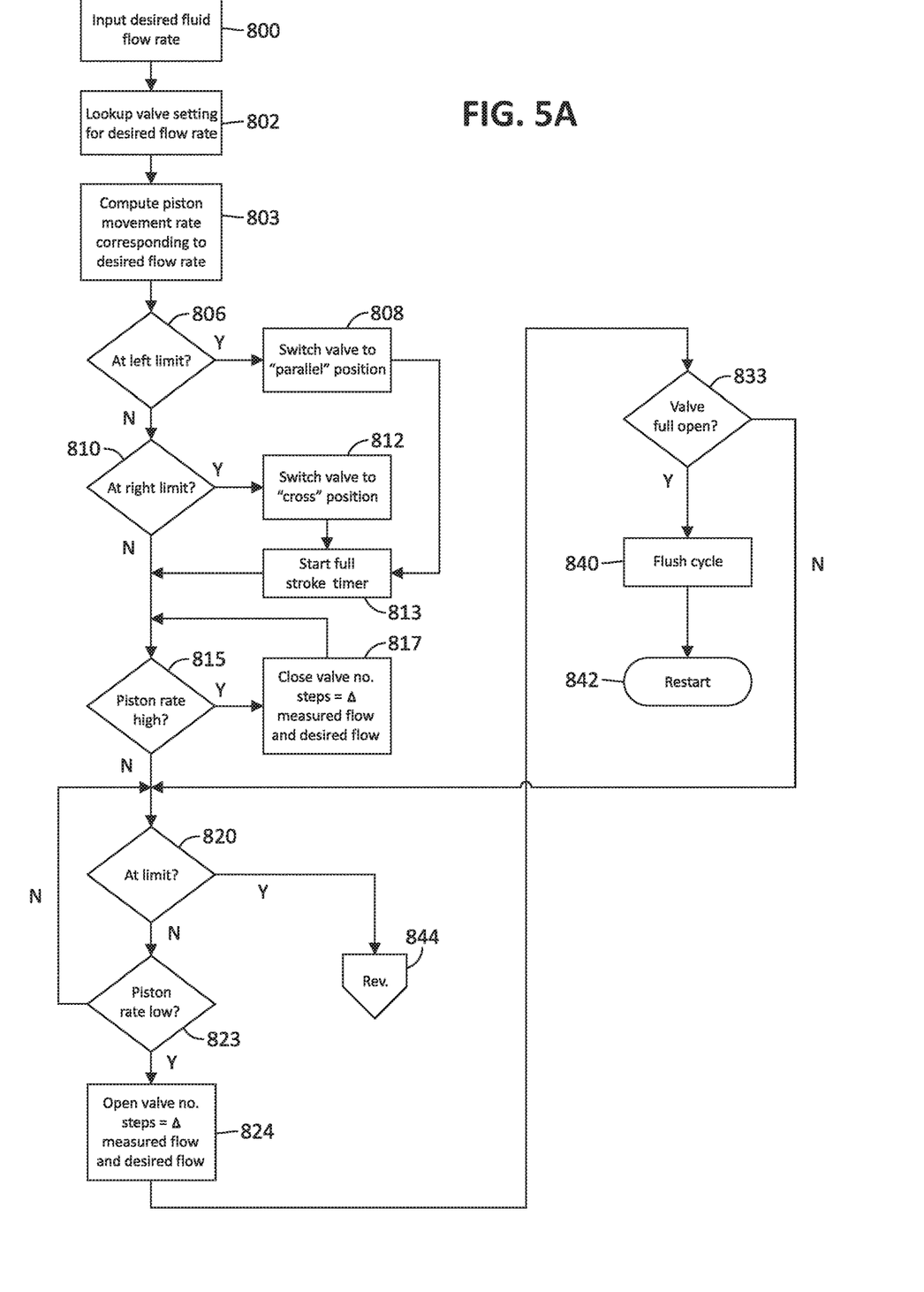
FIG. 5A and FIG. 5B are separate portions of a flowchart of a third method for controlling the apparatus depicted in FIG. 1B.
Figure 5B:
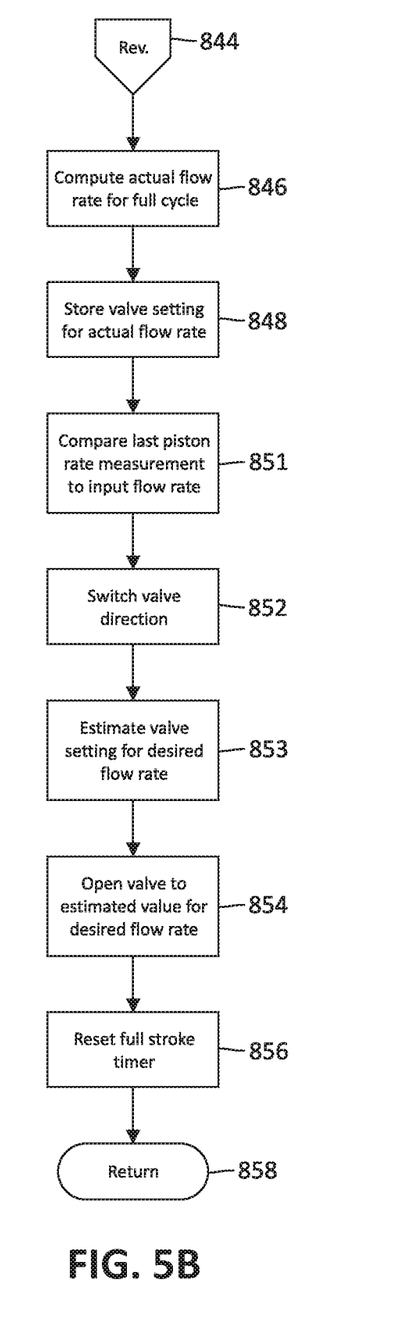

One particular method wherein the rate of change in the output of linear piston position sensor 46 is used to compute the current actual fluid flow rate and the valve setting is adjusted to compensate for any difference between the current actual fluid flow rate and the desired fluid flow rate input by the operator is illustrated in flowchart form in FIGS. 5A and 5B. This method may be used with an apparatus as illustrated in FIG. 1B wherein linear sensor 46 provides any form of output that may be correlated to the rate of movement of piston 22.

The method may begin at block 800 with the operator inputting a desired fluid flow rate. This information may be communicated to electronic control module (ECM) 14 via an umbilical cable (dash-dot line in FIG. 1B). At block 802, ECM 14 may then perform a table lookup (with interpolation, if necessary) to determine the valve setting expected to produce the desired flow rate. Using stepper motor 45, ECM 14 may then position metering valve 16 to the computed setting.

From the distance piston 22 must move per unit time to produce the desired flow rate may be computed (at block 803). This will depend upon the dimensions of metering body 12.

At decision diamond 806, the system may sense whether piston 22 is at its left limit of travel. If so (Y branch at 806), the valve is switched (at 808) to parallel flow position 18 and a timer configured for measuring the time required for a full stroke of piston 22 may be started (at 813). At decision diamond 810, the system may sense whether piston 22 is at its right limit of travel. If so (Y branch at 810), the valve is switched (at 812) to cross flow position 15 and a timer configured for measuring the time required for a full stroke of piston 22 may be started (at 813).

At decision diamond 815, the system may sense whether the measured rate of travel of piston 22 is greater than that calculated at block 803 and, if so, the valve may be closed (at 817) the number of steps corresponding to the difference between the observed flow rate and the desired flow rate on the system's flow curve (e.g. FIG. 2). This process continues in a loop until the position of valve 16 produces the calculated movement rate of piston 22 (and hence the desired fluid flow rate). The determination at decision diamond 815 may include a time delay in order to permit piston 22 to move a measurable distance.

At decision diamond 820, the system may determine whether piston 22 has reach a limit of its travel. If so (Y branch at 820), the system may proceed to execute the valve reversal routine (at 844) described hereinbelow.

It piston 22 is not at a limit (N branch at 820), the system may sense (at 823) whether the measured rate of travel of piston 22 is less than that calculated at block 803 and, if so, the valve may be opened (at 824) the number of steps corresponding to the difference between the observed flow rate and the desired flow rate on the system's flow curve (e.g. FIG. 2). At decision diamond 833, the system may sense whether valve 16 has been driven to its full open position without producing the desired flow rate. If so (Y branch at 833), the system may proceed to execute a flush cycle (at 840) in an effort to clear any blockage which may have occurred in valve 16. This process continues in a loop until the position of valve 16 produces the calculated movement rate of piston 22 (and hence the desired fluid flow rate). It will be appreciated by those skilled in the art that the determination at decision diamond 823 may include a time delay in order to permit piston 22 to move a measurable distance.

Valve reversal routine 844 is illustrated as a flowchart in FIG. 5B. At block 846, the actual fluid flow rate may be computed from the known volume of metering body 12 (less the volume of piston 22) and the length of time taken for piston 22 to move from one limit to the other (as measured by the full stroke timer). The valve position (e.g. number of steps of stepper motor 45 from a reference position) that produced the measured flow rate may then be stored in a table (at 848). In this way, the table of flow rate versus valve position may be updated with each cycle of piston 22. If valve 16 were opened or closed additional steps during the cycle (e.g. at 817 and/or 824), the stored valve position setting may be a time-weighted average of the valve positions used during the stroke of piston 22 or otherwise adjusted. In an embodiment, the valve position table may not be updated in the event that more than one valve position was used during a stroke.

At block 851 the system may compare the most recent measurement of the rate of movement of piston 22. If the measured rate differs from that required to produce the desired flow rate, the system may estimate (at 853) the valve setting required to produce the desired flow rate. In this way, the system adjusts itself iteratively to achieve the desired flow rate.

At block 852, the direction of travel of piston 22 is reversed by switching valve 16 from crossed-flow position 15 to parallel flow position 18, or vice versa. Valve 16 may then be positioned (at 854) to provide the desired flow rate.

At 856, the timer configured for timing the full stroke period is reset for measuring the next stroke and, at 858, the system may return (e.g. to 815) for the next stroke of piston 22.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. An apparatus for injecting a liquid phase chemical into a well, the apparatus comprising:
    a cylinder having a first end, a second end, and a longitudinal side extending between the first and second ends;
    a free piston movably disposed along a plurality of longitudinal positions in the cylinder between the first and second ends and dividing the cylinder into a first variable-volume chamber and a second variable-volume chamber;
    a first sensor comprising an array of Hall Effect sensors, the array of Hall Effect sensors disposed adjacent the longitudinal side of the cylinder and being magnetically responsive to each of the longitudinal positions of the free piston within the cylinder between the first and second ends;
    a first port defined in the first end and disposed in fluid communication with the first variable-volume chamber;
    a second port defined in the second end and disposed in fluid communication with the second variable-volume chamber;
    a chemical input line for supplying the liquid phase chemical to the cylinder;
    a chemical output line for supplying the liquid phase chemical from the cylinder to the well;
    a valve having at least one variable orifice and disposed in fluid communication with the chemical input line, the chemical output line, the first port, and the second port;
    a control system in communication the first sensor and the valve, the control system having a timer configured to time the period required for the free piston to travel a certain longitudinal distance within the cylinder, the control system configured to:
        compute the average fluid flow rate during the timed period,
        compare the computed average fluid flow rate to a desired flow rate, and
        adjust a size of the at least one variable orifice to minimize the difference between the computed flow rate and the desired flow rate.

2. The apparatus for injecting a liquid phase chemical into a well recited in claim 1 further comprising:
    a first fluid pressure sensor on the chemical input line; and
    a second fluid pressure sensor on the chemical output line.

3. The apparatus for injecting a liquid phase chemical into a well recited in claim 1 further comprising:
    at least one end sensor responsive to the free piston being at at least one of the first and second ends of the cylinder.

4. The apparatus of claim 1, wherein the array of Hall Effect sensors comprises triggers triggering steps between adjacent ones of the Hall Effect sensors in response to movement of the free piston along the longitudinal positions within the cylinder.

5. The apparatus of claim 4, wherein the control system is configured to:
   sense the triggered steps between the adjacent ones of the Hall Effect sensors in response to the movement of the free piston; and
   determine the certain longitudinal distance for the travel of the free piston based on the sensed steps; and
   determine, from the timer, the timed period required for the free piston to travel the determined longitudinal distance.

6. The apparatus of claim 4, wherein the control system is configured to:
   detect an absence in the steps between the adjacent ones of the Hall Effect sensors; and
   determine a failure in the movement of the free piston in response to the detected absence.

7. The apparatus of claim 4, wherein to trigger the steps, the triggers of the adjacent ones of the Hall Effect sensors are configured to:
   switch from an ON state to an OFF state for a leading one of the adjacent Hall Effect sensors in the array in response to the movement of the free piston away from the leading Hall Effect sensor; and
   switch from an OFF state to an ON state for a following one of the adjacent Hall Effect sensors in response to the movement of the free piston toward the following Hall Effect sensor.

8. A fluid injection system for controlling the distribution of fluid from a supply line to a selected well at an adjustable rate, the system comprising:
   a metering body having a bore for containing fluid, the bore having a first end, a second end, and a longitudinal side extending between the first and second ends;
   a fluid barrier segregating the bore into variable-volume first and second chambers, the fluid barrier movable freely in a plurality of longitudinal positions in the bore between the first and second ends in response to a pressure difference between the first and second chambers;
   a first input-output port disposed in the first end for passing fluid into and out of the first chamber;
   a second input-output port disposed in the second end for passing fluid into and out of the second chamber;
   a multi-position valve comprising a first valve position and a second valve position, the first valve position configured to pass fluid from the supply line into the first chamber, thereby moving the fluid barrier to displace fluid from the second chamber back through the valve to an injection point, the second valve position configured to pass fluid from the supply line to the second chamber, thereby moving the fluid barrier to displace fluid from the first chamber back through the valve to the injection point, the valve further comprising a variable valve opening configured to control flow between the supply line and the metering body;
   a linear position sensor comprising an array of Hall Effect sensors, the array of Hall Effect sensors disposed adjacent the longitudinal side of the bore and being configured to magnetically sense each of the longitudinal positions of the fluid barrier within the metering body between the first and second ends; and
   a control system in communication with the multi-position valve and the linear position sensor, the control system including a timer configured to time movement of the fluid barrier between known ones of the longitudinal positions, the control system configured to selectively adjust the variable valve opening in response to the timed movement of the fluid barrier between the known longitudinal positions and to selectively reverse between the first and second valve positions of the multi-position valve in response to certain ones of the longitudinal positions of the fluid barrier.

9. The fluid injection system recited in claim 8 further comprising:
   a first fluid pressure sensor on the supply line; and
   a second fluid pressure sensor on a line to the injection point.

10. The fluid injection system recited in claim 8 further comprising:
    at least one end sensor responsive to the fluid barrier being at at least one of the first and second ends of the metering body.

11. A method for injecting a fluid into a well comprising:
    operating a fluid injection system as recited in claim 10;
    inputting a desired fluid flow rate;
    calculating an expected time for a change in output of the linear position sensor at the desired fluid flow rate;
    continuing operation of the fluid injection system at an existing open position of the variable valve opening in response to the change in the output of the linear position sensor being detected at about the calculated time;
    continuing operation of the fluid injection system at a smaller open position of the variable valve opening in response to the change in the output of the linear position sensor being detected at less than the calculated time;
    continuing operation of the fluid injection system at a larger open position of the variable valve opening in response to the change in the output of the linear position sensor being detected at greater than the calculated time; and
    switching the multi-position valve from the first valve position for passing fluid from the supply line into the first chamber to the second valve position for passing fluid from the supply line to the second chamber upon actuation of the at least one end sensor responsive to the fluid barrier being at the at least one of the first and second ends of the metering body.

12. A method for injecting a fluid into a well comprising:
    operating a fluid injection system as recited in claim 8;
    inputting a desired fluid flow rate;
    calculating an expected time for a change in output of the linear position sensor at the desired fluid flow rate;
    continuing operation of the fluid injection system at an existing open position of the variable valve opening in response to the change in the output of the linear position sensor being detected at a first time within a preset time limit of the expected time;
    continuing operation of the fluid injection system at a smaller open position of the variable valve opening in response to the change in the output of the linear position sensor being detected at a second time outside the preset time limit and less than the expected time; and
    continuing operation of the fluid injection system at a larger open position of the variable valve opening in response to the change in the output of the linear position sensor being detected at a third time outside the preset time limit and greater than the expected time.

13. The method recited in claim 12 further comprising:
    opening the variable valve opening to a full-open position in response to an absence of the change in the output of the linear position sensor being detected within a fourth time interval that is greater than the calculated time by a preselected amount.

14. A method for injecting a fluid into a well comprising:
operating a fluid injection system as recited in claim 8;
monitoring output of the linear position sensor;
continuing operation of the fluid injection system at an existing opening position of the variable valve opening in response to a change in the output of the linear position sensor being detected within a first preselected time interval; and
increasing the variable valve opening by a preselected amount in response to a first absence of the change in the output of the linear position sensor being detected within the first preselected time interval.

15. The method recited in claim 14 further comprising:
opening the variable valve opening to a full-open position in response to a second absence in the change in the output of the linear position sensor being detected within a second time interval that is longer than the first preselected time interval.

16. A method for injecting a fluid into a well comprising:
operating a fluid injection system as recited in claim 8;
inputting a desired fluid flow rate;
measuring time required for the fluid barrier to move from a first of the longitudinal positions to a second of the longitudinal positions, wherein at least one of the first longitudinal position and the second longitudinal position is displaced from a limit of travel of the fluid barrier;
calculating an actual fluid flow rate from the measured time required for the fluid barrier to move from the first longitudinal position to the second longitudinal position;
continuing operation of the fluid injection system at an existing open position of the variable valve opening in response to the actual fluid flow rate being substantially equal to the desired fluid flow rate;
continuing operation of the fluid injection system at a smaller open position of the variable valve opening in response to the actual fluid flow rate being greater than the desired fluid flow rate; and
continuing operation of the fluid injection system at a larger open position of the variable valve opening in response to the actual fluid flow rate being less than the desired fluid flow rate.

17. The method recited in claim 16 further comprising:
opening the variable valve opening to a full-open position in response to the actual fluid flow rate being less than the desired fluid flow rate by a preselected amount.

18. The method recited in claim 11 further comprising:
timing the interval from the actuation of a first of the at least one end sensor responsive to the fluid barrier being at the first end of the metering body to the actuation of a second of the at least one end sensor responsive to the fluid barrier being at the second end of the metering body;
calculating an actual fluid flow rate from the timed interval;
adjusting a size of the variable valve opening to minimize any difference between the calculated actual fluid flow rate and the desired fluid flow rate.

19. The apparatus of claim 8, wherein the array of Hall Effect sensors comprises triggers triggering steps between adjacent ones of the Hall Effect sensors in response to the movement of the fluid barrier along the longitudinal positions within the metering body.

20. The apparatus of claim 19, wherein the control system is configured to:
sense the triggered steps between the adjacent ones of the Hall Effect sensors in response to the movement of the fluid barrier;
determine the known longitudinal positions of the fluid barrier based on the sensed steps; and
determine, from the timer, the timed movement of the fluid barrier between the known longitudinal positions.

21. The apparatus of claim 19, wherein the control system is configured to:
detect an absence in the steps between the adjacent ones of the Hall Effect sensors; and
determine a failure in the movement of the fluid barrier in response to the detected absence.

22. The apparatus of claim 19, wherein to trigger the steps, the triggers of the adjacent ones of the Hall Effect sensors are configured to:
switch from an ON state to an OFF state for a leading one of the adjacent Hall Effect sensors in the array in response to the movement of the fluid barrier away from the leading Hall Effect sensor; and
switch from an OFF state to an ON state for a following one of the adjacent Hall Effect sensors in response to the movement of the fluid barrier toward the following Hall Effect sensor.

\* \* \* \* \*